US011822927B2

(12) United States Patent
Shibayama et al.

(10) Patent No.: US 11,822,927 B2
(45) Date of Patent: Nov. 21, 2023

(54) BOOT TIMES IN AN INFORMATION PROCESSING DEVICE WITH EXTERNALLY CONNECTED DEVICES

(71) Applicant: LENOVO (Singapore) PTE. LTD., New Tech Park (SG)

(72) Inventors: Kazuya Shibayama, Yokohama (JP); Yuuki Matsuura, Yokohama (JP); Yusaku Morishige, Yokohama (JP); Naoyuki Araki, Yokohama (JP); Ken Sasaki, Yokohama (JP)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 229 days.

(21) Appl. No.: 16/386,054

(22) Filed: Apr. 16, 2019

(65) Prior Publication Data

US 2019/0370008 A1 Dec. 5, 2019

(30) Foreign Application Priority Data

May 29, 2018 (JP) .................................. 2018-102491

(51) Int. Cl.
*G06F 9/4401* (2018.01)
*G06F 13/42* (2006.01)

(52) U.S. Cl.
CPC ........ *G06F 9/4401* (2013.01); *G06F 13/4282* (2013.01); *G06F 2213/0042* (2013.01)

(58) Field of Classification Search
CPC .............. G06F 9/4401; G06F 13/4282; G06F 2213/0042; G06F 9/4411; G06F 9/4403; G06F 1/3215
See application file for complete search history.

(56) References Cited

U.S. PATENT DOCUMENTS

| 10,437,752 | B2* | 10/2019 | Xu ...................... G06F 13/4068 |
| 2007/0245038 | A1* | 10/2007 | Lu ......................... G06F 9/4411 |
| | | | 710/8 |
| 2016/0055009 | A1* | 2/2016 | Sakamoto ............. G06F 1/3215 |
| | | | 710/14 |

(Continued)

FOREIGN PATENT DOCUMENTS

| JP | 2001265707 A | 9/2001 |
| JP | 2013101710 A | 5/2013 |

(Continued)

*Primary Examiner* — Paul Yen
(74) *Attorney, Agent, or Firm* — Kunzler Bean & Adamson (57) ABSTRACT

An apparatus to shorten the time taken for executing a booting process includes, in one embodiment, a connection processing unit that establishes communication with and acquires information from a plurality of devices that are communicably coupled externally to an information processing device, the information relating to the plurality of devices regardless of whether a booting process is executed. The apparatus also includes a communication control unit that executes communication with each of the plurality of devices during the booting process, and a first processing unit that one of enables or disables communication between the communication control unit and a selected one of the plurality of devices in response to the acquired information related to the selected one of the plurality of devices. A method and a computer program product also perform functions of the apparatus.

14 Claims, 3 Drawing Sheets

(56) References Cited

U.S. PATENT DOCUMENTS

| | | | | |
|---|---|---|---|---|
| 2016/0321195 | A1* | 11/2016 | Ghosh | G06F 13/4282 |
| 2017/0017481 | A1* | 1/2017 | Cherian | G06F 3/017 |
| 2018/0081843 | A1* | 3/2018 | Kadgi | G06F 13/20 |
| 2019/0042503 | A1* | 2/2019 | Montero | G06F 13/4282 |
| 2019/0064879 | A1* | 2/2019 | Jeansonne | G06F 1/1632 |
| 2020/0311011 | A1* | 10/2020 | Kim | G06F 13/4081 |
| 2021/0048850 | A1* | 2/2021 | Hsia | G06F 1/1632 |

FOREIGN PATENT DOCUMENTS

| | | | |
|---|---|---|---|
| JP | 2013196575 | A | 9/2013 |
| JP | 2014197407 | A | 10/2014 |
| JP | 2016122268 | A | 7/2016 |

\* cited by examiner

BOOT TIMES IN AN INFORMATION PROCESSING DEVICE WITH EXTERNALLY CONNECTED DEVICES

FIELD

The subject matter disclosed herein relates to information processing devices and more particularly relates to a controlling method and a program.

BACKGROUND

There exists a hardware interface that allows the connection of external peripherals to an information processing device (e.g., a personal computer) over a single cable that includes connections over PCI Express, DisplayPort, USB, power, etc. Currently, this interface utilizes a USB Type-C standard based port. At startup, the information processing device firstly executes a program according to a BIOS (Basic Input Output System) and executes a booting process such as basic input and output control of equipment which is connected to such an input interface as described above, setting of an operation mode of a CPU (Central Processing Unit), startup of an OS (Operating System) and so forth. However, startup times of the information processing device may be affected by the detection of devices attached to the input interface.

SUMMARY

An apparatus to shorten the time taken for executing a booting process includes, in one embodiment, a connection processing unit that establishes communication with and acquires information from a plurality of devices that are communicably coupled externally to an information processing device, the information relating to the plurality of devices regardless of whether a booting process is executed. The apparatus also includes a communication control unit that executes communication with each of the plurality of devices during the booting process, and a first processing unit that one of enables or disables communication between the communication control unit and a selected one of the plurality of devices in response to the acquired information related to the selected one of the plurality of devices.

In various embodiments, the first processing unit enables or disables communication between the communication control unit and a selected one of the plurality of devices in response to a determination of presence of the selected one of the plurality of devices during the booting process. The apparatus also includes a second processing unit that acquires, from the connection processing unit, a connection status of each of the plurality of devices regardless of whether the booting process is executed.

In certain embodiments, the first processing unit enables or disabled communication between the communication control unit and a selected one of the plurality of devices in response to the connection status acquired by the second processing unit. The first processing unit may be a processor and the second processing unit may be an embedded controller. The connection processing unit may be a power deliver ("PD") controller that establishes a communication connection with the plurality of devices. In certain embodiments, the plurality of devices that are communicably coupled externally are coupled to the information processing device via USB Type-C.

A method for shortening boot times for information processing devices with externally connected devices is disclosed. In one embodiment, the method includes establishing, by a connection processing unit, communication with and acquiring information from a plurality of devices communicably coupled externally to an information processing device, the information relating to the devices regardless of whether a booting process is executed. The method also includes communicating with each of the plurality of devices during the booting process, enabling or disabling, by a first processing unit, communication between a communication control unit and a selected one of the plurality of devices in response to the acquired information related to the selected one of the plurality of devices.

A program product for shortening boot times is also disclosed. In one embodiment, the program product includes a computer readable storage medium that stores code executable by a processor, the executable code including code to establish, by a connection processing unit, communication with and acquiring information from a plurality of devices communicably coupled externally to an information processing device, the information relating to the devices regardless of whether a booting process is executed. The executable code also include code to communicate with each of the plurality of devices during the booting process, and enable or disable, by a first processing unit, communication between a communication control unit and a selected one of the plurality of devices in response to the acquired information related to the selected one of the plurality of devices.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

An information processing device, a control method, and a program, to which the present invention is applied, will be described below with reference to the accompanying drawings. Embodiments to be described below are such that, when the information processing device booted, support for an external input interface that could significantly slow the booting process while detecting external devices, need not be disabled. Previous to the embodiments of this disclosure, when the booting information processing device had externally connected devices via the external interface (e.g., a Thunderbolt-based element, in the following, also abbreviated as "TBT"), it was necessary to enable TBT support in the BIOS, and detect and enumerate devices connected vie the external interface. Also, even when one or more external devices were missing, it is necessary to wait for a while after the BIOS sends a command to the TBT controller. Therefore, a processing time in execution of the booting process may be more extended than in a case where the TBT support is disabled. Beneficially, in the present embodiments, such a configuration that presence/absence of the equipment which is connected to the TBT is decided without executing the enumeration by the TBT controller and thereby making automatic (with no need of an operation by a user) the switching between enabling and disabling of the TBT support (i.e., execution and non-execution of the enumeration by the TBT controller) possible without changing the BIOS settings. In the following, specific configurations will be described. The embodiments of the present disclosure described below provide an apparatus, method, and program to shorten the time which is taken for execution of the booting process.

Figure 1:
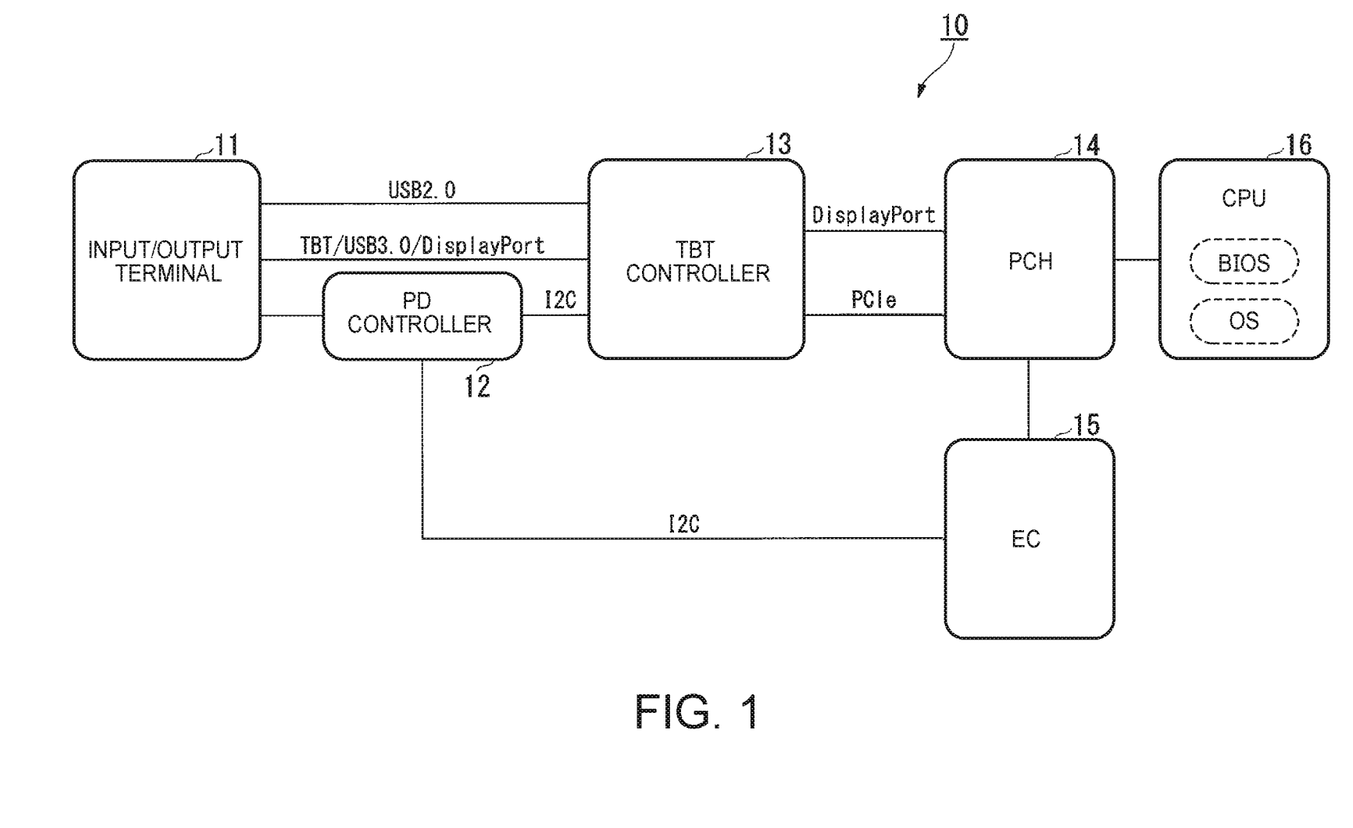
FIG. 1 is a schematic block diagram illustrating one embodiment of an information processing apparatus according to embodiments of the present disclosure.

FIG. 1 is a schematic block diagram illustrating one embodiment of an information processing apparatus according to embodiments of the present disclosure. An information processing apparatus 10 illustrated in FIG. 1 is an electronic apparatus such as a desktop PC (Personal Computer), a Laptop PC (a notebook PC), a tablet PC and so forth. The information processing apparatus 10 which is illustrated in FIG. 1 is equipped with an input/output terminal 11, a PD (Power Delivery) controller 12, a TBT controller 13, a PCH (Platform Controller Hub) 14, an EC (Embedded Controller) 15, and a CPU (Central Processing Unit) 16. For clarity, only main configurations of the information processing apparatus 10 which relate to a booting process are illustrated in FIG. 1.

In certain embodiments, the input/output terminal 11 is, for example, a connector which conforms to the USB Type-C and is able to be connected with equipment which conforms to the TBT or USB protocol to be communicable therewith. In addition, utilization of the input/output terminal 11 as a terminal which conforms to the DisplayPort is also possible.

In certain embodiments, the PD controller 12 conforms to the USB PD (Power Delivery) and controls power supply to the equipment which is connected to the input/output terminal 11. In addition, the PD controller 12 executes processing of establishing communication connection with the equipment which is connected to the input/output terminal 11. The PD controller 12 executes the processing of establishing communication connection with the equipment which is connected to the input/output terminal 11 regardless of whether the booting process is executed and acquires information which relates to the equipment with which communication connection is established. For example, the PD controller 12 acquires vender information (for example, a vender ID) of the equipment, device information (for example, a device ID) which makes specification of the kind, the model number and so forth of the equipment possible and so forth from the equipment with which communication connection is established. In addition, the PD controller 12 is connected to each of the TBT controller 13 and the EC 15 via a serial bus (for example, I²C).

In certain embodiments, in a case where the equipment with which communication connection is established by the PD controller 12 is present, the TBT controller 13 detects the equipment concerned and executes enumeration on the basis of the booting process according to the BIOS and executes processing of communication with the equipment. The TBT controller 13 executes the processing of communication with the equipment which conforms to the protocols of, for example, the TBT, the USB, the DisplayPort and so forth. In addition, the TBT controller 13 is connected to the PCH 14 via, for example, a DisplayPort-based bus and a PCIe (PCI Express)-based bus.

In various embodiments, the PCH 14 supports the function of the CPU 16 and performs data bus management and so forth. For example, the PCH 14 mediates communication between the TBT controller 13 and the CPU 16 and communication between the EC 15 and the CPU 16. The EC 15 is an embedded controller with a microcomputer being embedded and has a battery management function, a power source management function, a keyboard controller function and so forth. The EC 15 acquires various kinds of information from the PD controller 12. For example, in a case where communication connection with the equipment which is connected to the input/output terminal 11 is established by the PD controller 12, the EC 15 acquires vender information and device information of the equipment concerned and information (in the following, also referred as "communication establishment information") which indicates that communication with the equipment concerned is established as the equipment which is connected to the TBT (a communication path is established) from the PD controller 12. In addition, the EC 15 acquires information which relates to a voltage and a current whose supply to the equipment which is connected to the input/output terminal 11 is possible from the PD controller 12.

In some embodiments, the EC 15 is able to acquire various kinds of information from the PD controller 12 regardless of pieces of processing according to the BIOS and the OS which are executed by the CPU 16 and therefore is able to acquire the vender information, the device information and the communication establishment information of the equipment which is connected to the input/output terminal 11 before execution of the booting process according to the BIOS. For example, the EC 15 acquires the various kinds of information from the PD controller 12 in a predetermined cycle and holds the acquired information therein.

In various embodiments, the CPU 16 is a central processing unit which functions as a control center of the information processing apparatus 10. For example, the CPU 16 initializes hardware by executing the BIOS program and executes the booting process. In addition, the CPU 16 starts up the OS in the booting process and executes processing of the OS. For example, in the booting process according to the BIOS, the CPU 16 acquires the information (for example, the vender information, the device information and the communication establishment information) which relates to the equipment which is connected to the input/output terminal 11 from the EC 15 and controls execution/non-execution of the communication processing by the TBT controller 13 on the basis of the acquired information.

In one example, in the booting process, the CPU 16 decides presence/absence of the equipment which is connected to the TBT on the basis of the information (for example, the vender information, the device information and the communication establishment information) which relates to the equipment which is connected to the input/output terminal 11. Then, in the booting process, in a case of deciding presence of the equipment which is connected to the TBT, the CPU 16 enables the TBT support and executes the communication processing by the TBT controller 13. On the other hand, in the booting process, in a case of deciding absence of the equipment which is connected to the TBT, the CPU 16 disables the TBT support and does not execute the communication processing by the TBT controller 13.

In execution of the booting process according to the BIOS, the information processing apparatus 10 decides presence/absence of the equipment which is connected to the TBT on the basis of the information (for example, the vender information, the device information and the communication establishment information) that the EC 15 acquires from the PD controller 12 before execution of the booting process and which relates to the equipment which is connected to the input/output terminal 11 (the equipment which is connected to the TBT) and automatically makes the switch between enabling and disabling of the TBT support (that is, execution and non-execution of the enumeration by the TBT controller 13) in this way. Therefore, in a state of absence of the equipment which is connected to the TBT, the information processing apparatus 10 is able to shorten the time which is taken for execution of the booting process by automatically disabling the TBT support (that is, not executing the enumeration by the TBT controller 13). In addition, in a state of presence of the equipment which is connected to the TBT, the information processing apparatus 10 automatically enables the TBT support with no need of change of the BIOS settings and restart by a user and therefore is able to shorten the time which is taken for execution of the booting process and is able to make troublesome operations unnecessary.

Figure 2:
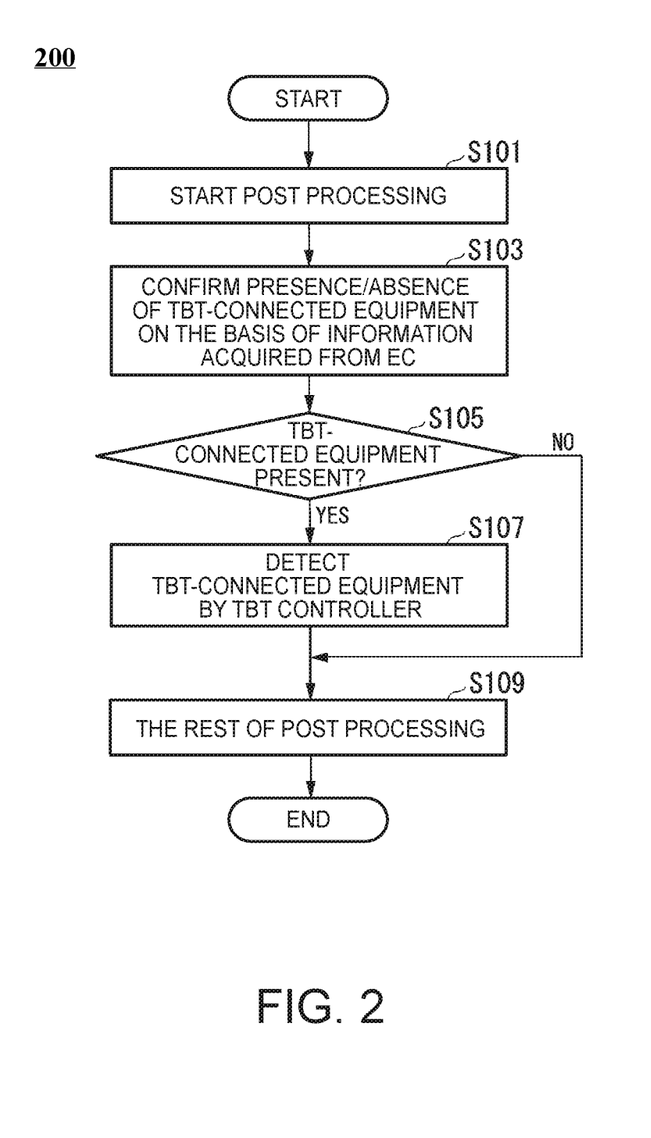
FIG. 2 is a schematic flowchart diagram illustrating one example of a method for POST processing in accordance with embodiments of the present disclosure.

FIG. 2 is a schematic flowchart diagram illustrating one example of a method 200 for POST processing in accordance with embodiments of the present disclosure. The method 200 may be performed by processing logic that may comprise hardware (e.g., circuitry, dedicated logic, programmable logic, microcode, etc.), software (such as instructions run on a processing device), firmware, or a combination thereof. In one embodiment, the method 200 is performed by the CPU 16.

The method 200 starts, and at block S101 the processing logic starts the POST processing by executing the BIOS program. At block S103, the processing logic acquires the information (for example, the vender information, the device information and the communication establishment information) that the EC 15 acquires from the PD controller 12 and which relates to the equipment which is connected to the input/output terminal 11 and decides presence/absence of the equipment which is connected to the TBT on the basis of the acquired information.

The method 200 continues, and the processing logic decides, at block S105, if TBT connected-equipment is present. If the determination is "yes", the processing logic detects, at block S107, TBT-connected equipment via the TBT controller 13 and performs the enumeration. If the determination is "no" the method 200 continues to block S109.

At block S109, the processing logic executes the rest of the POST processing and then terminates execution of the POST processing. Incidentally, in the booting process, the processing logic executes OS startup processing and so forth after termination of execution of the above-described POST processing.

Figure 3:
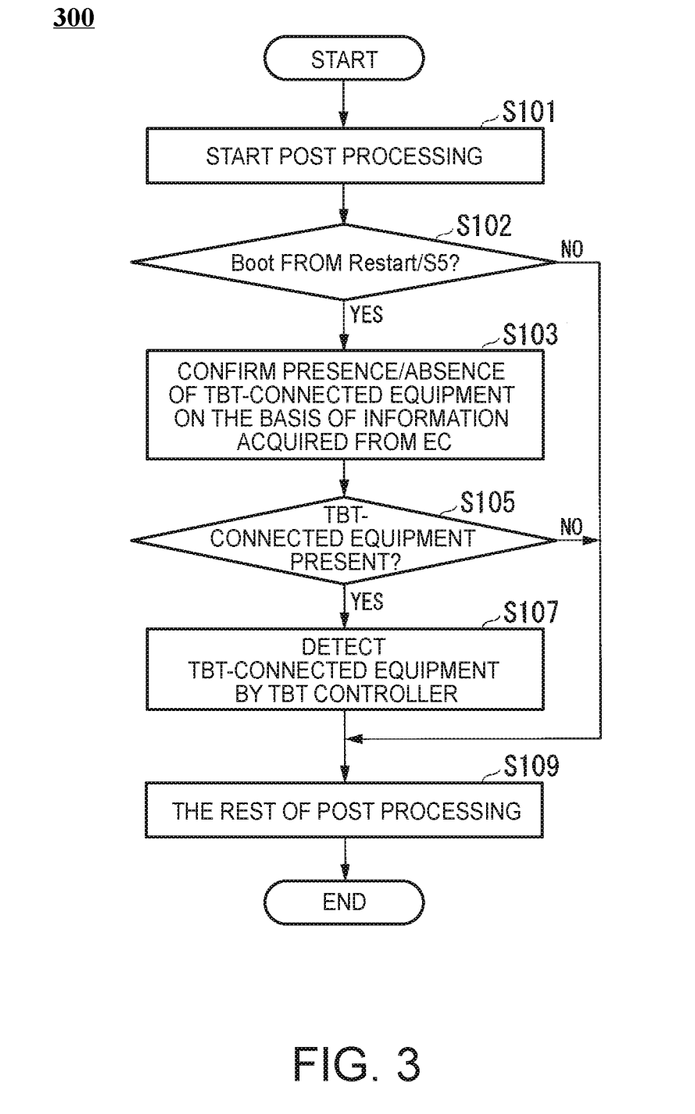
FIG. 3 is a schematic flowchart diagram illustrating another example of a method for POST processing in accordance with embodiments of the present disclosure.

FIG. 3 is a schematic flowchart diagram illustrating another example of a method 300 for POST processing in accordance with embodiments of the present disclosure. The method 300 may be performed by processing logic that may comprise hardware (e.g., circuitry, dedicated logic, programmable logic, microcode, etc.), software (such as instructions run on a processing device), firmware, or a combination thereof. In one embodiment, the method 300 is performed by the CPU 16. In FIG. 3, the same numeral is assigned to a step/block/process which corresponds to each step/block/process illustrated in FIG. 2 and description thereof is omitted. The method 300 illustrated in FIG. 3 is different from the method 200 in FIG. 2 in the point that a process of step S102 is added to the method 200 in FIG. 2. The process of step S102 is a method of deciding whether the POST processing which is being executed is the booting process which is executed from a restart state (Restart) or a normal power-OFF state (S5).

The method 300 starts and the processing logic, at block S101, starts post processing, as described above with reference to FIG. 2. At block S102, the processing logic decides if POST processing is being executed from the restart state or the normal power-OFF state ("S5"). If Yes, the processing logic, at block S103, confirms the presence/absence of TBT-connected equipment on the basis of information acquired from EC, and proceeds to perform the steps of blocks S103-S109, as described above with reference to FIG. 2. Alternatively, if the determination is "no", the processing logic determines that the POST processing which is being executed is not the booting process which is executed from the restart state (Restart) or the normal power-OFF state (S5)(NO), the processing logic does not execute the processes of blocks S103 to block S107 and proceeds to block S109 and executes the rest of the POST processing and then terminates execution of the POST processing. Incidentally, the case where the POST processing is not the booting process which is executed from the restart state (Restart) or the normal power-OFF state (S5) is a case of restarting from, for example, a standby (sleep) state, a hibernation state or the like where a just preceding work state or work data is recorded.

As described above, the information processing apparatus 10 according to the present embodiment, is a computer apparatus which executes the booting process according to the BIOS and is equipped with the PD controller 12 (the connection processing unit), the TBT controller 13, and the CPU 16 (the first processing unit). The PD controller 12 acquires, from the equipment (the other devices) which are connected to the information processing apparatus 10, information which relates to the equipment concerned regardless of whether the booting process is executed. The TBT controller 13 executes processing of communication with the equipment which is connected to the information processing apparatus 10 in the booting process. Then, when executing the booting process, the CPU 16 controls execution/non-execution of processing (for example, the enumeration) by the TBT controller 13 on the basis of the information that the PD controller 12 acquires and which relates to the equipment (that is, the equipment which is connected to the TBT).

Thereby, the information processing apparatus 10 is able to automatically make the switch between enabling and disabling of the BIOS-based TBT support on the basis of the information which relates to the equipment which is connected to the TBT and therefore is able to shorten the time which is taken for execution of the booting process. Specifically, in a state of absence of the equipment which is connected to the TBT, the information processing apparatus 10 does not execute the enumeration by the TBT controller 13 in the booting process according to the BIOS and therefore is able to suppress an increase in POST time and is able to shorten the time which is taken for execution of the booting process. For example, in the related art, in a state where the TBT support is disabled in the state of absence of the equipment which is connected to the TBT, for example, in a case where the POST time which is taken up to execution of EFI (Extensile Firmware Interface) Shell Boot is about 7 to 8 seconds, the POST time which is taken in a state where the TBT support is enabled is increased to about 8 to 9 seconds, that is, the POST time is increased by about 1 to 2 seconds. On the other hand, in the present embodiment, since the TBT support is automatically switched to the disable state in the state of absence of the equipment which is connected to the TBT, the above-described increase in POST time does not occur.

Additionally, in the state of presence of the equipment which is connected to the TBT, the information processing apparatus 10 executes the enumeration by the TBT controller 13 in the booting process according to the BIOS and then communicates with the equipment which is connected to the TBT. Consequently, there is no need to restart the information processing apparatus 10 by changing the BIOS settings from the disable state to the enable state as has been ever done and therefore the information processing apparatus 10 is able to shorten the time which is taken for execution of the booting process and is able to make the troublesome operations unnecessary.

In certain embodiments, the respective configurations that the information processing apparatus 10 according to the present embodiment has may be also described as follows. The PD controller 12 executes the processing of establishing communication connection with the equipment (the other device) which is connected to the information processing apparatus 10. The TBT controller 13 executes the processing of communication with the equipment with which communication is established by the PD controller 12. Then, when executing the booting process, the CPU 16 controls execution/non-execution of processing (for example, the enumeration) by the TBT controller 13 on the basis of presence/absence of the equipment with which communication is established by the PD controller 12.

Thereby, the information processing apparatus 10 is able to automatically make the switch between enabling and disabling of the BIOS-based TBT support in accordance with whether the communication connection with the equipment which is connected to the TBT is established and therefore is able to shorten the time which is taken for execution of the booting process. Specifically, in the state of absence of the equipment with which communication is established by the TBT, the information processing apparatus 10 does not execute the enumeration by the TBT controller 13 in the booting process according to the BIOS and therefore is able to suppress the increase in POST time and is able to shorten the time which is taken for execution of the booting process. In addition, in the state of presence of the equipment with which communication is established by the TBT, the information processing apparatus 10 executes the enumeration by the TBT controller 13 in the booting process according to the BIOS and then communicates with the equipment which is connected to the TBT. Consequently, there is no need to restart the information processing apparatus 10 by changing the BIOS settings from the disable state to the enable state as has been ever done and therefore the information processing apparatus 10 is able to shorten the time which is taken for execution of the booting process and is able to make the troublesome operations unnecessary.

In certain embodiments, the information processing apparatus 10 is equipped with the EC 15 (one example of the second processing unit which is described in the claims). The EC 15 acquires, from the PD controller 12, the information which relates to the equipment which is connected to the information processing apparatus 10 or the information which indicates presence/absence of the equipment with which communication is established by the PD controller 12 regardless of whether the booting process is executed. Then, when executing the booting process, the CPU 16 controls execution/non-execution of the processing by the TBT controller 13 on the basis of the information that the CPU 16 acquires from the PD controller 12 via the EC 15. Thereby, the CPU 16 (the BIOS) is able to acquire information which relates to equipment with which communication is impossible at the time point of starting execution of the booting process and which is connected to the TBT or the information which indicates presence/absence of the equipment with which communication is established by the TBT from the EC 15 before starting execution of the booting process. Accordingly, the information processing apparatus 10 is able to decide presence/absence of the equipment which is connected to the TBT on the basis of the information that the EC 15 acquires from the PD controller 12 and is able to automatically make the switch between enabling and disabling of the TBT support with no execution of the enumeration via the TBT controller 13 in the booting process. For example, a processing time which is necessary for the CPU 16 (the BIOS) to decide presence/absence of the equipment which is connected to the TBT via the EC 15 is in a range of several milliseconds to several ten milliseconds which are physically imperceptible levels. On the other hand, as described above, in a case where the BIOS detects the equipment which is connected to the TBT via the TBT controller 13 and executes the enumeration, a few seconds is necessary even in a state where the equipment is not connected to the TBT. Therefore, according to the present embodiment, it is possible to shorten the time which is taken for execution of the booting process.

In various embodiments, the example that the CPU 16 (the BIOS) acquires the information which relates to the equipment which is connected to the information processing apparatus 10 or the information which indicates presence/absence of the equipment with which communication is established by the PD controller 12 via the EC 15 is described. However, the present invention is not limited to the above-described example. For example, the CPU 16 (the BIOS) may be configured to acquire the information which relates to the equipment which is connected to the information processing apparatus 10 or the information which indicates presence/absence of the equipment with which communication is established by the PD controller 12 directly from the PD controller 12. Additionally, in the above-described embodiment, the example that the information processing apparatus 10 automatically makes the switch between enabling and disabling of the TBT support is described. However, as the BIOS settings, automatic selection may be added to selection of enabling or disabling which has been ever made. In the above-mentioned case, when setting to the automatic selection, a control of automatically making the switch between enabling and disabling of the TBT support would be performed. Then, it becomes unnecessary to change the BIOS settings in normal use, for example, by setting the default to the automatic selection. Incidentally, setting itself of the TBT support may be eliminated from the BIOS settings so as to automatically make the switch between enabling and disabling of the TBT support typically.

In addition, in some embodiments, the example that setting for the equipment which is connected to the TBT (setting of enabling/disabling of the TBT support) is automatically switched in the booting process is described. However, automatic setting is not limited to the equipment which conforms to the TBT and may be also applied to pieces of equipment which conform to other communication standards. In addition, the example that the USB Type-C connector is used as the input/output terminal 11 is described. However, connectors which conform to other standards may be also used.

Incidentally, the above-described information processing apparatus 10 includes a computer system therein. Then, the processes in the respective configurations that the above-described information processing apparatus 10 includes may be also executed by recording a program for realizing functions of the respective configurations that the above-described information processing apparatus 10 includes in a computer readable recording medium, making the computer system read the program which is recorded in the recording medium and executing the program. Here, "making the computer system read the program which is recorded in the recording medium and executing the program" includes installation of the program into the computer system. "The computer system" which is described here shall include software such as the OS and hardware such as peripherals. In addition, "the computer system" may also include a plurality of computer devices which are connected with each other/one another over a network including communication lines such as the Internet, a WAN, a LAN, a private line and so forth. In addition, "the computer readable recording medium" means portable media such as a flexible disk, a magneto-optical disk, a ROM, a CD-ROM and so forth and storages such as a hard disk built in the computer system. The recording medium which stores the program in this way may be a non-transitory recording medium such as the CD-ROM.

In addition, the recording medium also includes internally and externally disposed recording media which are accessible from a distribution server for distribution of the program concerned. Incidentally, a configuration in which the program concerned is divided into a plurality of parts to be downloaded at mutually different timings, and thereafter respective configurations that the information processing apparatus 10 has integrate the divided parts of the program together may be adopted, and the distribution servers which distribute the divided parts of the program respectively may be different from one another. Further, "the computer readable recording medium" shall also include media which each hold the program for a definite period of time, such as the server in a case where the program is transmitted over the network and a volatile memory (a RAM) in the computer system which serves as a client. In addition, the above-described program may be also the one which is adapted to implement some of the above-described functions. Further, the program may be also the one which is able to implement the above-described functions by being combined with a program which is already recorded in the computer system, that is, a so-called differential file (differential program).

In addition, some or all of the respective functions that the information processing apparatus 10 according to the above-described embodiment includes may be realized as an integrated circuit such as an LSI (Large Scale Integration). The respective functions may be individually processorized and some or all of the functions may be integrated with one another and then processorized. In addition, an approach for circuit integration may be realized by a private circuit, a general-purpose processor and so forth, not limited to the LSI. In addition, in a case of appearance of a technique for realizing an integrated circuit which would take the place of the LSI owing to progress of the semiconductor technology, the integrated circuit realized by the above-described technique may be used.

Although one embodiment of the present invention is described in detail with reference to the drawings as above, the specific configurations are not limited to the above-described configurations and various design changes, alterations and so forth are possible within a range not deviating from the gist of the present invention.

What is claimed is:

1. An apparatus comprising:
    a connection processing unit that, before a booting process is executed:
        establishes communication with and acquires device information from a plurality of devices that are communicably coupled externally to an information processing device,
        wherein the information acquired includes device identification and model number; and
        wherein the connection processing unit one of enables or disables, in response to a presence of one of the plurality of devices, an enumeration of a controller in a BIOS that corresponds to a type of one of the plurality of devices that are communicably coupled externally;
    a communication control unit that executes communication with each of the plurality of devices during the booting process;
    a first processing unit that one of enables or disables communication between the communication control unit and a selected one of the plurality of devices in response to the acquired information related to the selected one of the plurality of devices; and
    a second processing unit that acquires, from the connection processing unit, a connection status of each of the plurality of devices before the booting process is executed, and where the first processing unit enables or disables communication between the communication control unit and a selected one of the plurality of devices in response to the connection status acquired by the second processing unit.

2. The apparatus of claim 1, where the first processing unit enables or disables communication between the communication control unit and a selected one of the plurality of devices in response to a determination of presence of the selected one of the plurality of devices during the booting process.

3. The apparatus of claim 1, where the first processing unit is a processor and the second processing unit is an embedded controller.

4. The apparatus of claim 1, where the connection processing unit is a power deliver ("PD") controller that establishes a communication connection with the plurality of devices.

5. The apparatus of claim 1, where the plurality of devices that are communicably coupled externally are coupled to the information processing device via USB Type-C.

6. A method comprising:
    establishing, before a booting process is executed, by a connection processing unit;
        communication with and acquiring information from a plurality of devices communicably coupled externally to an information processing device,
        wherein the information acquired includes device identification and model number; and
        one of enabling or disabling, in response to a presence of one of the plurality of devices, an enumeration of a controller in a BIOS that corresponds to a type of one of the plurality of devices that are communicably coupled externally;
    communicating with each of the plurality of devices during the booting process;
    enabling or disabling, by a first processing unit, communication between a communication control unit and a selected one of the plurality of devices in response to the acquired information related to the selected one of the plurality of devices; and acquiring, by a second processing unit, from the connection processing unit a connection status of each of the plurality of devices before the booting process is executed, and enabling or disabling, by the first processing unit, communication between the communication control unit and a selected one of the plurality of devices in response to the connection status acquired by the second processing unit.

7. The method of claim 6, further comprising enabling or disabling communication between the communication control unit and a selected one of the plurality of devices in response to a determination of presence of the selected one of the plurality of devices during the booting process.

8. The method of claim 6, where the first processing unit is a processor and the second processing unit is an embedded controller.

9. The method of claim 6, where the connection processing unit is a power deliver ("PD") controller that establishes a communication connection with the plurality of devices.

10. The method of claim 6, where the plurality of devices that are communicably coupled externally are coupled to the information processing device via USB Type-C.

11. A program product comprising a non-transitory computer readable storage medium that stores code executable by a processor, the executable code comprising code to:
  establish, before a booting process is executed, by a connection processing unit;
    communication with and acquiring information from a plurality of devices communicably coupled externally to an information processing device,
    wherein the information acquired includes device identification and model number; and one of enable or disable, in response to a presence of one of the plurality of devices, an enumeration of a controller in a BIOS that corresponds to a type of one of the plurality of devices that are communicably coupled externally;
  communicate with each of the plurality of devices during the booting process;
  enable or disable, by a first processing unit, communication between a communication control unit and a selected one of the plurality of devices in response to the acquired information related to the selected one of the plurality of devices; and
  acquire, by a second processing unit, from the connection processing unit a connection status of each of the plurality of devices before the booting process is executed, and enable or disable, by the first processing unit, communication between the communication control unit and a selected one of the plurality of devices in response to the connection status acquired by the second processing unit.

12. The program product of claim 11, where the executable code further comprises code to enable or disable communication between the communication control unit and a selected one of the plurality of devices in response to a determination of presence of the selected one of the plurality of devices during the booting process.

13. The program product of claim 11, where the first processing unit is a processor and the second processing unit is an embedded controller.

14. The program product of claim 11, where the plurality of devices that are communicably coupled externally are coupled to the information processing device via USB Type-C.

* * * * *